(12) United States Patent
Matsuyama

(10) Patent No.: US 7,669,131 B2
(45) Date of Patent: Feb. 23, 2010

(54) IMAGE BROWSING APPARATUS AND IMAGE BROWSING METHOD

(75) Inventor: Kojiro Matsuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 11/286,464

(22) Filed: Nov. 23, 2005

(65) Prior Publication Data

US 2006/0127054 A1 Jun. 15, 2006

(30) Foreign Application Priority Data

Nov. 25, 2004 (JP) ............................ P2004-340122

(51) Int. Cl.
*G06F 3/00* (2006.01)
*G06F 7/00* (2006.01)
*G11B 21/08* (2006.01)
(52) U.S. Cl. .................. 715/730; 707/104.1; 369/30.08
(58) Field of Classification Search ................ 715/727, 715/730; 707/104.1; 369/30.08; 704/500, 704/503; 381/98
See application file for complete search history.

(56) References Cited

U.S. PATENT DOCUMENTS

| | | | | |
|---|---|---|---|---|
| 5,812,736 A | * | 9/1998 | Anderson | 386/96 |
| 6,278,466 B1 | * | 8/2001 | Chen | 345/473 |
| 6,369,835 B1 | * | 4/2002 | Lin | 715/726 |
| 6,438,315 B1 | * | 8/2002 | Suzuki et al. | 386/95 |
| 6,804,295 B1 | * | 10/2004 | Belknap | 375/240.01 |
| 2003/0085913 A1 | * | 5/2003 | Ahmad et al. | 345/730 |
| 2004/0189827 A1 | * | 9/2004 | Kim et al. | 348/231.4 |
| 2005/0168453 A1 | * | 8/2005 | Ueda | 345/204 |
| 2005/0185949 A1 | * | 8/2005 | Ueda | 396/310 |
| 2006/0204140 A1 | * | 9/2006 | Ueda et al. | 382/305 |

* cited by examiner

*Primary Examiner*—Ting Lee
(74) *Attorney, Agent, or Firm*—Wolf, Greenfield & Sacks, P.C.

(57) ABSTRACT

An image browsing apparatus has: a display unit for displaying image data; a reproducing unit for reproducing audio data; a detector for detecting a feature of the audio data reproduced by the reproducing unit; and a controller for, when predetermined audio data is reproduced by the reproducing unit, controlling an updating interval of the image data displayed to the display unit on the basis of the feature of the predetermined audio data detected by the detector.

9 Claims, 15 Drawing Sheets

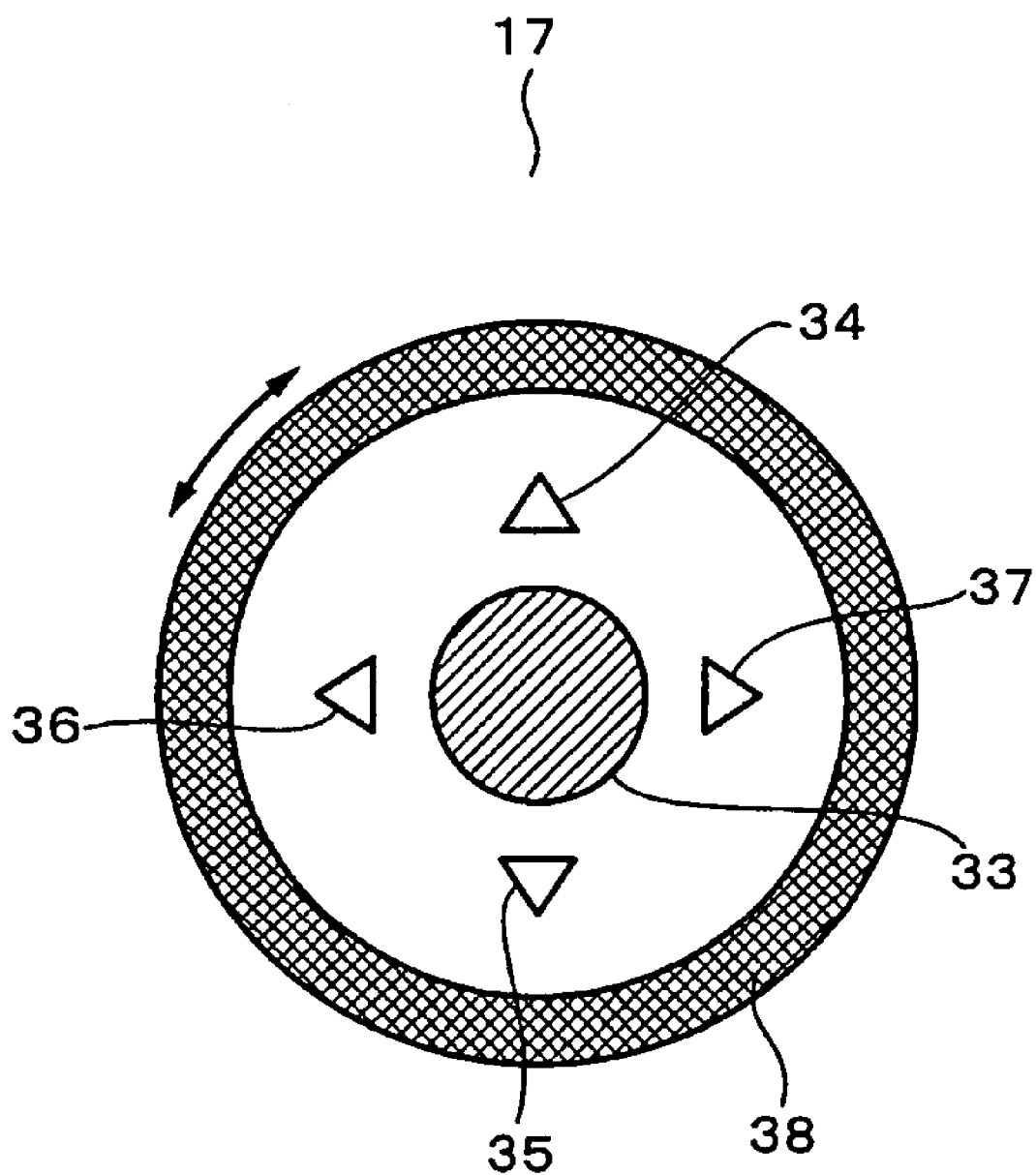

Fig. 4

| | AUDIO MODE | CAMERA MODE |
|---|---|---|
| DECIDE BUTTON | PLAY/PAUSE<br>VARIOUS DECISION<br>BOOKMARK SETTING/CANCEL | TRIGGER TO THUMBNAIL DISPLAY<br>QUICK REVIEW<br>VARIOUS DECISION |
| JOG DIAL | FOCUSING MOVEMENT<br>TRIGGER TO TRACK LIST | ZOOM<br>FOCUSING MOVEMENT |
| LEFT KEY | FR<br>REVIEW | SELF TIMER SWITCHING<br>FOCUSING MOVEMENT |
| RIGHT KEY | FF<br>CUE | FLUSH SWITCHING<br>FOCUSING MOVEMENT |
| UP KEY | FOCUSING MOVEMENT | MACRO SWITCHING<br>FOCUSING MOVEMENT |
| DOWN KEY | FOCUSING MOVEMENT | JACKET PHOTOGRAPHING MODE SWITCHING<br>FOCUSING MOVEMENT |

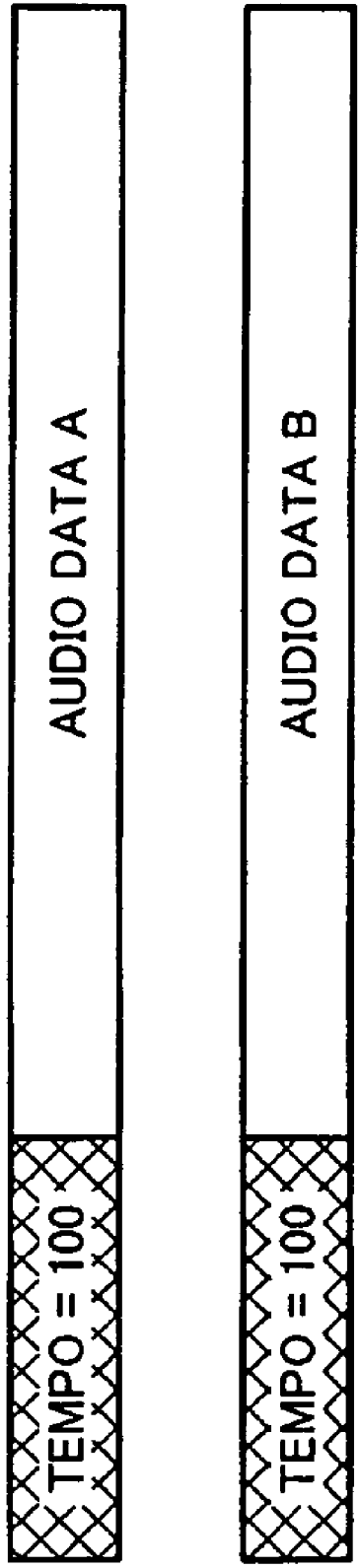

IMAGE BROWSING APPARATUS AND IMAGE BROWSING METHOD

CROSS REFERENCES TO RELATED APPLICATIONS

The present invention contains subject matter related to Japanese Patent Application JP 2004-340122 filed in the Japanese Patent Office on Nov. 25, 2004, the entire contents of which being incorporated herein by reference.

BACKGROUND OF THE INVENTION

1. Field of the Invention

The invention relates to an image browsing apparatus and an image browsing method and, more particularly, to an image browsing apparatus and an image browsing method for controlling so that a change in feature of music which is being reproduced is synchronized with a display interval of an image.

2. Description of the Related Arts

An image pickup apparatus such as a digital camera or the like often has a function called a "slideshow" in which images obtained by reducing photographed images (such images are referred to as thumbnail images) are sequentially displayed on an LCD (Liquid Crystal Display). In the recent slideshow function, there is a function with such a device as to gradually zoom and display not only the thumbnail images but also the photographed images. When such a slideshow is executed, the photographed images are switched and displayed at an interval of time which has been set as a default or an interval of time which has been set by the user.

In recent years, a music reproducing apparatus in which not only image are merely displayed when the slideshow is executed but also music is simultaneously reproduced to thereby allow the viewer not to lose interest has also been proposed. The invention regarding a file recording system or the like of image data and audio data in an image display apparatus for reproducing an audio sound together with still images has been disclosed in the Official Gazette of Japanese Patent No. 3558048.

SUMMARY OF THE INVENTION

However, the above related art has the following problem. That is, although the music can be reproduced simultaneously with the execution of the slideshow, the timing for switching the images is set to the predetermined interval in a manner similar to the related art.

Therefore, in spite of the fact that the display of the image and the reproduction of the music are simultaneously executed, there is no sense of unity. For example, in the case where the images are displayed at regular intervals although music of a fast tempo is reproduced or the like, the timing when the display of the image is switched is slightly deviated from the tempo of the music, so that a sense of discomfort may be given to the user as a viewer on the contrary.

It is desirable to provide an image browsing apparatus and an image browsing method in which a feature of music which is reproduced is detected and control is made so that a change in the detected music feature is synchronized with a display interval of images.

To solve the above problem, according to an embodiment of the present invention, there is provided an image browsing apparatus having a function for simultaneously reproducing images and music, comprising: detecting means for detecting a feature of the music which is reproduced simultaneously with the image; and display control means for controlling so that the change in the feature of the music detected by the detecting means is synchronized with a display interval of the images.

According to an embodiment of the present invention, there is provided an image browsing method of simultaneously reproducing images and music, comprising the steps of: detecting a feature of the music which is reproduced simultaneously with the image; and controlling so that the change in the feature of the music detected by the detecting step is synchronized with a display interval of the images.

According to the embodiment of the present invention, since the feature of the music which is reproduced is detected and the control can be made so that the change in the detected feature of the music is synchronized with the display interval of the images, the display of the image and the reproduction of the music can be executed with a sense of unity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing a concentrated controller in the embodiment of the invention;

FIG. 4 is a diagram showing an example of a function which is allocated to each key;

FIG. 12 is a diagram showing an embodiment in which a photograph display updating interval is controlled on the basis of attribute (meta) information;

DETAILED DESCRIPTION OF THE PREFERRED EMBODIMENT

Figure 1:
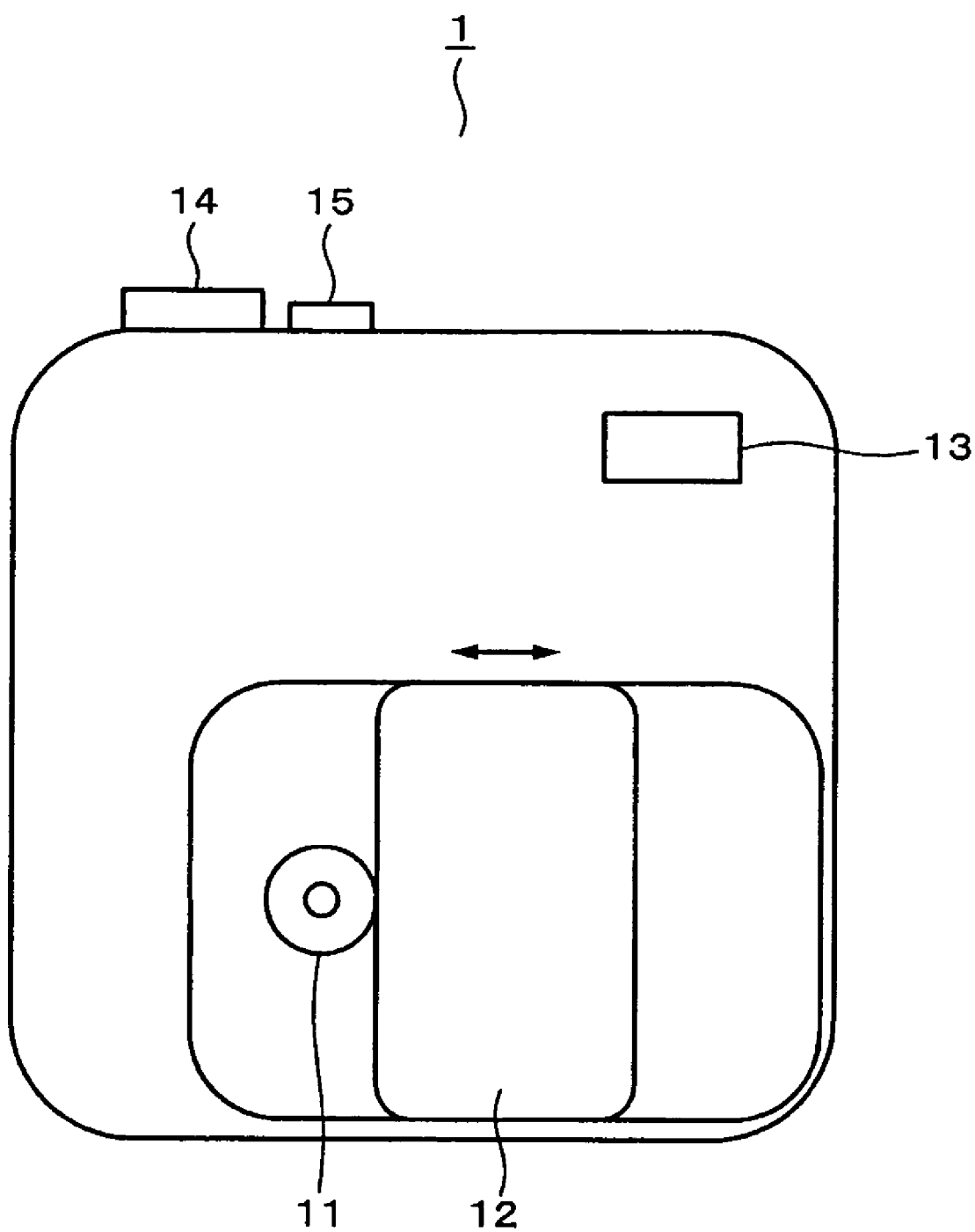
FIG. 1 is a diagram showing a front surface of a camera in an embodiment of the invention.

An embodiment of the invention will be described hereinbelow with reference to the drawings. In the following embodiment, explanation will be made with respect to the case where a camera 1 with an audio recording/reproducing function is used as an example of an image browsing apparatus. A mode to execute an image pickup function in the camera 1 is referred to as a camera mode and a mode to execute a function of at least either recording or reproduction of an audio sound is referred to as an audio mode. The camera mode is constructed by a photographing mode to actually photograph and a browsing mode to reproduce photographed images.

The photographed image is the image which was photographed and denotes image data stored in an internal memory built in the camera 1 or an external memory which is detachable from the camera 1. It is assumed that the photographed image includes image data obtained by compressing the image data stored in the internal memory or the external memory. In the following embodiment, explanation will be made with respect to the case where a thumbnail mage is used as an example of the photographed image.

In the camera 1 in the embodiment, a magnetooptic disk is used as a recording medium of the image data or audio data. In the magnetooptic disk which is used in the embodiment of the invention, a physical attribute of the disk such as a form factor is substantially the same as that of the disc which is used by what is called an MD (Mini-Disc) system. However, the data recorded on the disk and a layout of the data arranged on the disk are different from those of the conventional MD.

More specifically speaking, in the embodiment, an FAT (File Allocation Table) system is used as a file management system. Thus, the present apparatus can guarantee compatibility with the existing personal computer. It is now assumed that the terminology "FAT" or "FAT system" is generally used to indicate file systems of various PC bases.

In the embodiment, by improving an error correcting method and a modulating method of the existing MD system, a recording capacity of the data is increased and raising the reliability of the data. Further, by encrypting contents data, an illegal copy is prevented and a copyright of the contents data is protected.

As a recording/reproducing format, there are: the specification of MD1 as a next generation using a disc (that is, physical medium) that is substantially the same as the disc used in the existing MD system; and the specification of MD2 as a next generation in which although a form factor and an external appearance are similar to those of the disc used in the existing MD system, by using a DWDD (Domain Wall Displacement Detection) technique, a recording density in the line recording direction is raised and the recording capacity is further increased.

In the existing MD system, a magnetooptic disk having a diameter of 64 mm enclosed in a cartridge is used as a recording medium. A thickness of disc is equal to 1.2 mm and a center hole having a diameter of 11 mm is formed at the center of the disc. The cartridge has a shape in which a length is equal to 68 mm, a width is equal to 72 mm, and a thickness is equal to 5 mm.

In both of the specification of the next-generation MD1 and the specification of the next-generation MD2, the shapes of those discs and cartridges are the same. In each of the disc of the specification of the next-generation MD1 and the disc of the specification of the next-generation MD2, a starting position of a lead-in area starts from the position of 29 mm and it is similar to that of the disc used in the existing MD system.

In the next-generation MD2, a track pitch is set to 1.25 μm. In the next-generation MD1 using the disc used in the existing MD system, a track pitch is set to 1.6 μm. A bit length is set to 0.44 μm/bit in the next-generation MD1 and to 0.16 μm/bit in the next-generation MD2. A redundancy is set to 20.50% in both of the next-generation MD1 and the next-generation MD2.

In the disc of the specification of the next-generation MD2, a recording capacity in the line density direction is improved by using the DWDD technique. The DWDD technique uses such a phenomenon that when the disc temperature reaches a predetermined temperature, a cutting layer enters a magnetically neutral state and a magnetic wall transferred to a reproducing layer moves, so that a small mark is seen in a large size in a beam spot.

That is, in the disc of the specification of the next-generation MD2, at least a magnetic layer serving as a recording layer in which information is recorded, the cutting layer, and a magnetic layer for reproducing the information are laminated on a transparent substrate. The cutting layer becomes a layer for adjusting a switched coupling force. When the disc temperature reaches the predetermined temperature, the cutting layer enters the magnetically neutral state and the magnetic wall transferred to the reproducing layer is transferred to the magnetic layer for reproducing. Thus, the small mark can be seen in the beam spot. Upon recording, the small mark can be formed by using a laser pulse magnetic field modulating technique.

In the disc of the specification of the next-generation MD2, in order to improve a detrack margin, crosstalks from a land, crosstalks of a wobble signal, and a focusing leakage, the groove is set to be deeper than that of the conventional MD disc and an inclination of the groove is set to be sharp. In the disc of the specification of the next-generation MD2, a depth of groove is set to, for example, 160 to 180 nm. The inclination of the groove is set to, for example, 60 to 70°. A width of groove is set to, for example, 600 to 700 nm.

As for the optical specification, in the disc of the specification of the next-generation MD1, a wavelength λ of laser beam is set to 780 nm and a numerical aperture NA of an objective lens of an optical head is set to 0.45. Also in the specification of the next-generation MD2, similarly, a laser wavelength λ is set to 780 nm and a numerical aperture NA of an objective lens of an optical head is set to 0.45.

In each of the specification of the next-generation MD1 and the specification of the next-generation MD2, a groove recording method is used as a recording method. That is, the groove (groove on the surface of the disc) is used as a track for the recording and reproduction.

As for an error correction coding method, a convolution code according to ACIRC (Advanced Cross Interleave Reed-Solomon Code) is used in the existing MD system. However, in the specification of the next-generation MD1 and the specification of the next-generation MD2, a block completion type code in which an RS-LDC (Reed Solomon-Long Distance Code) and a BIS (Burst Indicator Subcode) are combined is used.

By using the block completion type error correction code, a linking sector is unnecessary. In the error correcting method in which the LDC and the BIS are combined, when a burst error is generated, an error location can be detected by the BIS. Erasure correction can be made by the LDC code by using the error location.

As an addressing method, a wobble groove method in which after a single spiral groove is formed, wobbles as address information are formed on both sides of the groove is used. Such an addressing method is called ADIP (Address in Pregroove). In the existing MD system and the specifications of the next-generation MD1 and the next-generation MD2, line densities are different. While the convolution code called ACIRC is used as an error correction code in the existing MD system, the block completion type code in which the LDC and the BIS are combined is used in the specifications of the next-generation MD1 and the next-generation MD2. Therefore, redundancies are different and a relative positional relation between the ADIP and the data changes. Therefore, in the specification of the next-generation MD1 using the disc of substantially the same physical structure as that of the existing MD system, a handling method of the ADIP signal is made different from that in the existing MD system. In the specification of the next-generation MD2, the specification of the ADIP signal is changed so as to further meet the specification of the next-generation MD2.

As for a modulating method, while EFM (8 to 14 Modulation) is used in the existing MD system, an RLL(1,7)PP (RLL; Run Length Limited, PP; Parity Preserve/Prohibit rmtr (repeated minimum transition runlength)) (hereinbelow, referred to as 1-7pp modulation) is used in the specification of the next-generation MD1 and the specification of the next-generation MD2. As for a detecting method of the data, partial response PR(1,2,1)ML is used in the next-generation MD1 and a Viterbi decoding system using partial response PR(1,–1)ML is used in the next-generation MD2.

As for a disc driving method, CLV (Constant Linear Velocity) or ZCAV (Zone Constant Angular Velocity) is used. A standard linear velocity is set to 2.4 m/sec in the specification of the next-generation MD1 and to 1.98 m/sec in the specification of the next-generation MD2. In the specification of the existing MD system, the standard linear velocity is set to 1.2 m/sec in the disc of 60 minutes and to 1.4 m/sec in the disc of 74 minutes.

In the specification of the next-generation MD1 using the disc used as it is in the existing MD system, the total recording capacity of the data per disc is equal to about 300 Mbytes (in the case of using a disc of 80 minutes). Since the modulating method is changed from EFM to the 1-7pp modulation, the window margin is changed from 0.5 to 0.666. In terms of this point, a high density of 1.33 times as large can be realized. Since the error correcting method is changed from the ACIRC method to the combination of the BIS and LDC, data efficiency is improved. In terms of this point, the high density which is 1.48 times as large can be realized. Integratedly, the data capacity which is about 2 times as large as that in the existing MD system is realized by using the similar disc.

In the disc of the specification of the next-generation MD2 using the DWDD technique, the further high density in the line density direction is realized and the total data recording capacity is equal to about 1 Gbytes.

A data rate at the standard linear velocity is set to 4.4 Mbits/sec in the next-generation MD1 and to 9.8 Mbits/sec in the next-generation MD2.

Among the foregoing MDs, only the recording and reproduction of audio data can be performed in the existing MD and the recording and reproduction of the audio data and the recording and reproduction of image data can be performed in the next-generation MD1 and the next-generation MD2. The audio data and the image data can be also allowed to mixedly exist in the next-generation MD1 and the next-generation MD2.

FIG. 1 shows a front surface of the camera 1 with the audio recording/reproducing function in the embodiment of the invention. A photographing lens 11 and a lens cover 12 which can be slid in the horizontal direction are provided for the front surface. A stroboscopic light emitting unit 13 is also provided.

Figure 2:
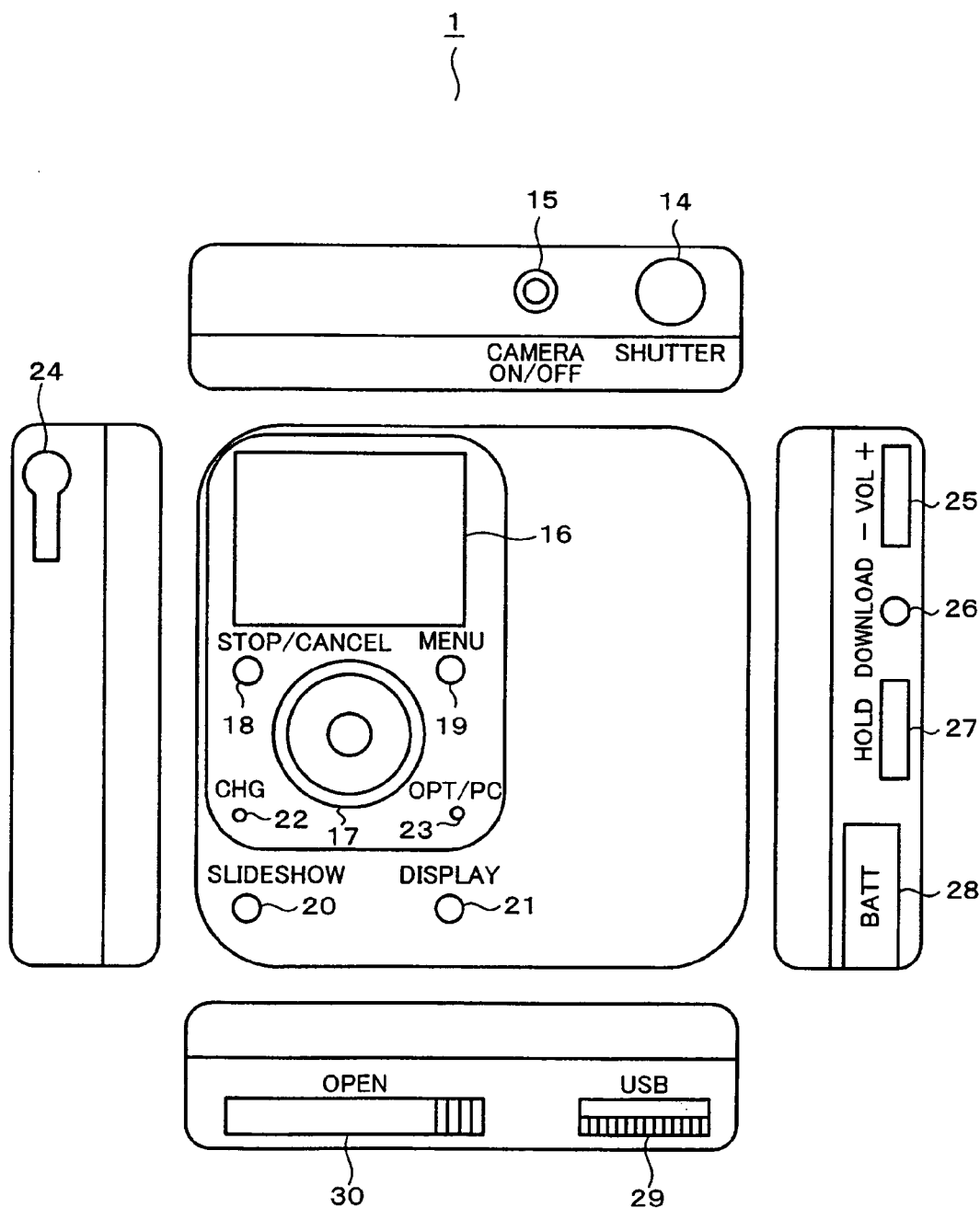
FIG. 2 is a diagram showing a rear view, a top view, a bottom view, a right side elevational view, and a left side elevational view of the camera in the embodiment of the invention.

FIG. 2 shows a rear view, a top view, a left side elevational view, and a right side elevational view, and a bottom view of the camera 1. For example, an LCD (Liquid Crystal Display) 16 serving as a display screen of various kinds of information is provided on the rear surface of the camera 1.

As input devices which are provided for a rear surface of the camera 1, a concentrated controller 17 having an almost circular shape, a menu button 19, a stop/cancel button 18, a slideshow button 20, and a display button 21 are provided.

Besides the input devices, a CHG lamp 22 constructed by an LED (Light Emitting Diode) or the like to notify the user that the camera is being charged and an OPT/PC lamp 23 showing that the camera is communicating with a personal computer (PC) are also provided for the rear surface of the camera 1.

A shutter button 14 is provided on the upper surface of the camera 1. The shutter button 14 can be depressed at two stages. In the state of what is called "semi-press", an auto-focusing function and an auto-exposure control are executed. In the "full-press" state, the photographing is executed. A camera button 15 to switch ON/OFF of a camera mode is provided.

A remote control jack 24 to connect the camera 1 to a remote controller, which will be explained hereinafter, is provided on the left side surface of the camera 1. A button 25 for adjusting a sound volume, a slide type hold button 27 to invalidate the operation of the input device, and a battery enclosing unit 28 are provided on the right side surface. A download button 26 is a button to execute downloading of the image data or the like from a personal computer in the case where, for example, the camera 1 is connected to the personal computer or the like.

A USB (Universal Serial Bus) terminal 29 to connect, for example, the personal computer by USB connection is provided on the bottom surface of the camera 1. An open button 30 to enclose the magnetooptic disk into the camera 1 is also provided. The magnetooptic disk is enclosed into a disk enclosing unit in a casing of the camera 1.

FIG. 3 shows an example of the foregoing concentrated controller 17. The concentrated controller 17 has an almost circular shape and a decide button 33 is provided at the center. Keys in the upper, lower, left, and right directions are provided around the decide button 33 and each key is a button which can be pressed. The buttons in the respective directions are referred to as an up key 34, a down key 35, a left key 36, and a right key 37. A rotatable jog dial 38 is provided around the concentrated controller 17.

FIG. 4 is a table showing an example of a typical function which is allocated to each key of the concentrated controller 17 every mode. A specific use example of each key in each mode will now be described with reference to FIG. 4.

First, the use example of an audio mode will be explained. When the decide button 33 is pressed in the audio mode, the reproduction is started in the case where the audio reproduction is stopped.

A fast-forward function is mainly executed when the right key 37 is operated. When the right key 37 is shortly pressed during the audio reproduction, an optical head advances to the head of the track next to the track which is at present being reproduced and the reproduction is started. When the right key 37 is shortly pressed during the audio stop, the optical head advances to the head of the track next to the track in the stop state and the reproduction is stopped.

When the right key 37 is pressed long during the audio reproduction, a fast-forward reproduction is started from the position where the data is being reproduced. When the right key 37 is pressed long during the audio pause, the fast-forward reproduction is started from the stop position.

A fast-return function is mainly executed when the left key 36 is operated. When the left key 36 is shortly pressed during the audio reproduction, if the midway of the track which is being reproduced is being reproduced, the optical head is returned to the head of the track and the reproduction is started. When the head of the track is being reproduced, the optical head is returned to the head of the one-preceding track and the reproduction is started. When the left key 36 is shortly pressed during the audio stop, the optical head is returned to the head of the track before the track where the reproduction has been stopped.

When the left key 36 is pressed long during the audio reproduction, the fast-return reproduction is started from the position where the data is being reproduced. When the left key 36 is pressed long during the audio pause, the fast-return is started from the stop position.

When the stop/cancel button 18 is pressed during the audio reproduction, the audio reproduction is stopped. If there is no new input for a predetermined time after the stop, a power source is automatically shut off and the apparatus enters a sleep mode.

When the decide button 33 is pressed during the audio reproduction, the reproduction is stopped and the apparatus enters a pause mode.

The use example in the camera mode will now be described. When the camera button 15 is pressed in the camera mode, the camera mode is finished, the power source is shut off, and the apparatus enters the sleep mode.

The left key 36 displays the image before the selected image in the browsing mode. The right key 37 displays the image after the selected image.

When the decide button 33 is pressed in the camera browsing mode, the whole display screen display of the image which is displayed on the LCD 16 and the display of the thumbnail image are switched.

Figure 5:
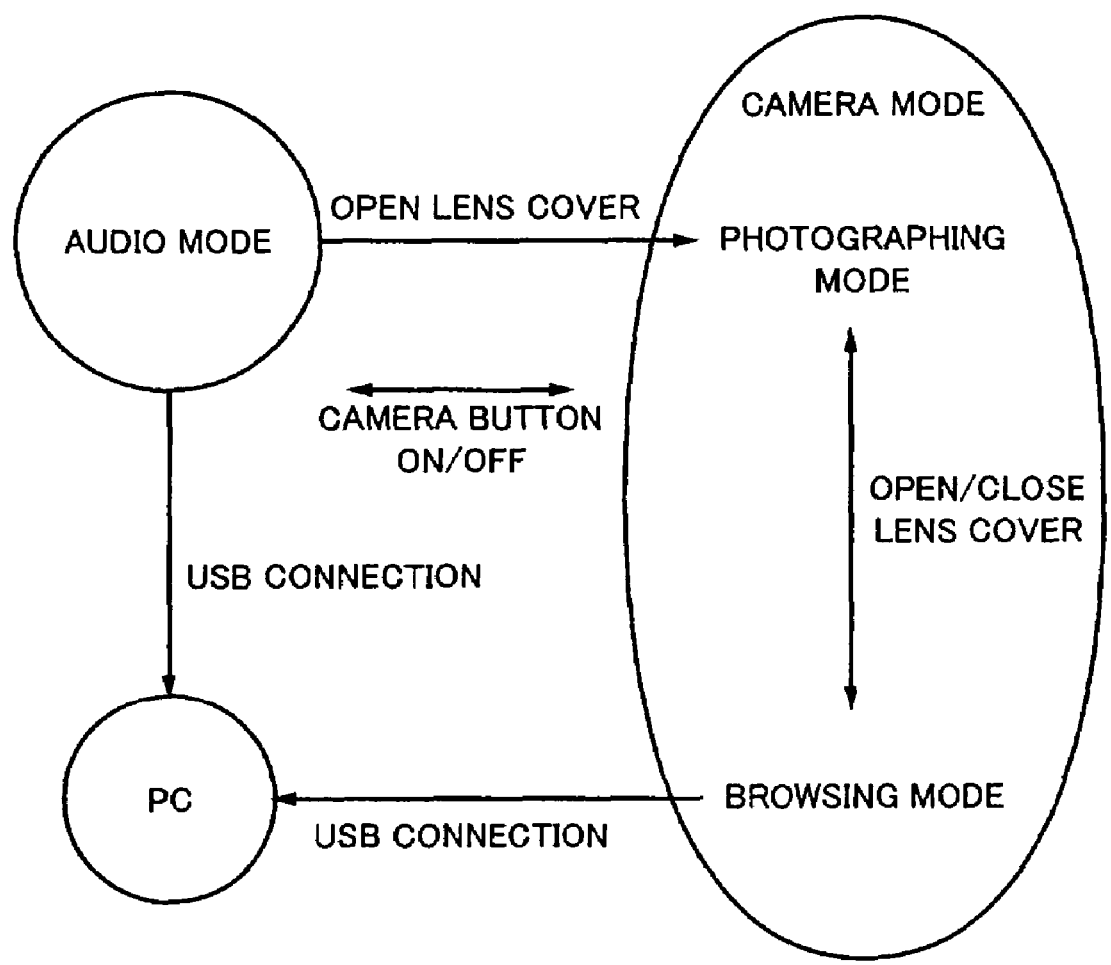
FIG. 5 is a schematic diagram showing switching of modes in the embodiment of the invention.

FIG. 5 shows the switching of the mode of the camera 1 in the embodiment. The camera mode is activated by turning on/off the camera button 15. When the lens cover 12 is opened in the audio mode, the apparatus is automatically switched to the camera mode.

By opening/closing the lens cover 12 in the state of the camera mode, the photographing mode and the browsing mode are switched. In the state where the lens cover 12 is open, the photographing mode is set. When it is closed, the browsing mode is set.

By USB connecting the camera 1 to the personal computer in the state other than the state during the audio reproduction in the audio mode or in the browsing mode of the camera mode, data can be transmitted and received between the camera 1 and the personal computer.

As mentioned above, when there is no input of the input device for a predetermined time in the audio mode, the power source is automatically shut off and the apparatus enters the sleep mode. If some operation is inputted in the sleep mode where the hold button 27 is not turned on, the power source is automatically supplied. Therefore, there is no need to additionally provide a power ON/OFF button.

Although the camera 1 operates in either the camera mode or the audio mode as mentioned above, when the slideshow button 20 is operated and the slideshow is executed, the reproduction in the audio mode and the browsing mode are simultaneously made operative. In other words, the photographed images are reproduced and displayed while reproducing the music. In the reproduction of the music when the slideshow is executed, the music may be reproduced from the start time of the music which has been reproduced lastly and such an operation is referred to as a "resume function".

Figure 6:
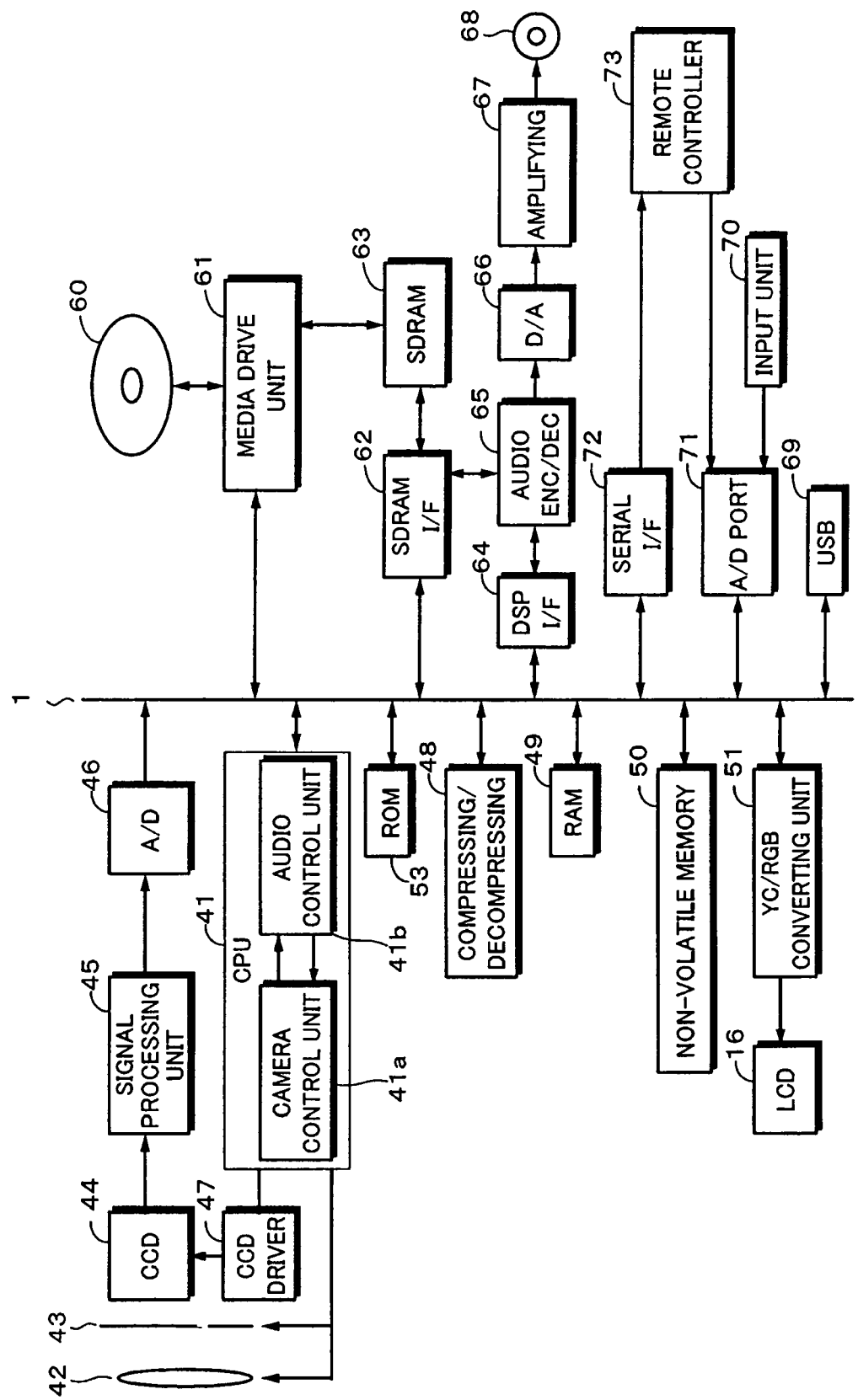
FIG. 6 is a block diagram showing a construction of a signal processing system of the camera 1 in the embodiment of the invention.

FIG. 6 shows a construction of a signal processing system of the camera 1 in the embodiment of the invention. The camera 1 mainly includes a camera unit, an audio unit, a control unit, and an operation unit.

First, the camera unit will be described. In the embodiment, the camera conforms with the specification of the current standard camera which has been predetermined as a standard of JEITA (Japan Electronics and Information Technology industries Association).

That is, in the embodiment, the camera conforms with the standard of a file system of a DCF (Design rule for Camera File System) and conforms with the file format of an Exif (Exchangeable image file format for digital still camera). In a JPEG (Joint Photographic Coding Expert Group) file format, an area called an application marker segment has been defined and information peculiar to the application can be stored there. According to the Exif file format, information peculiar to the Exif has been stored in this area.

In FIG. 6, a light amount of light entered from a lens 42 is adjusted by a diaphragm 43 and the adjusted light is supplied to a CCD 44. The lens 42 and the diaphragm 43 are controlled by a camera control unit 41*a* of a CPU 41, so that a lens position and the light amount are adjusted.

A control signal from the CPU 41 is supplied to a CCD driver 47. Driving timing and a driving pulse are supplied from the CCD driver 47 to the CCD 44. In the CCD 44, photoelectric conversion is executed in accordance with the incident light amount and an electric signal according to the incident light amount is formed.

The electric signal formed by the CCD 44 is supplied to a signal processing unit 45. In the signal processing unit 45, predetermined signal processes such as noise reducing process, luminance correcting process, defective pixel correcting process, color correction, and the like are executed.

A signal outputted from the signal processing unit 45 is converted into a digital signal by an A/D converting unit 46 and temporarily written into a RAM 49. Image data read out of the RAM 49 is compressed by a compressing/decompressing unit 48 in accordance with, for example, the JPEG (Joint Photographic Coding Expert Group) method. The compressed image data is stored into an SDRAM (Synchronous Dynamic Random Access Memory) 63 through an SDRAM interface (I/F) 62. The digital signal outputted from the A/D converting unit 46 may be supplied to the compressing/decompressing unit 48 without passing through the RAM 49.

The SDRAM 63 has a capacity of, for example, 8 Mbytes. The SDRAM 63 includes an area for error correction and an area in which track information, disk information, and FAT information are held. A buffering area for the image data and the audio data is provided for the SDRAM 63. For example, 6 Mbytes in 8 Mbytes are used for the buffering area. An area for a sound-skip preventing memory (called a shock proof memory) at the time of vibration is provided in the buffering area.

The image data stored in the SDRAM 63 is recorded onto a magnetooptic disk 60 (hereinafter, properly referred to as a disk 60) through a media drive unit 61.

The reproduction of the image data recorded on the disk 60 will now be described. The image data recorded on the disk 60 is read out by the media drive unit 61 and stored into the SDRAM 63.

The data stored into the SDRAM 63 is supplied to the compressing/decompressing unit 48 through the SDRAM I/F 62. In the compressing/decompressing unit 48, the compressed image data is decompressed and supplied to a YC/RGB converting unit 51. In the YC/RGB converting unit 51, a predetermined image process is executed and a reproduction image is displayed on the LCD 16.

The audio data unit will now be described. First, the recording of the audio data will be explained. For example, the camera 1 is connected to the personal computer (not shown) by using a USB 69. The download button 26 is pressed and the desired audio data is downloaded from the personal computer.

The downloaded audio data is encoded by an audio encoder/decoder unit 65 through the SDRAM I/F 62. The encoded audio data is stored into the SDRAM 63 through the SDRAM I/F 62. The data stored in the SDRAM 63 is sequentially read out and recorded onto the disk 60 through the media drive unit 61.

Although not shown, a communication I/F may be provided to thereby enable the audio data to be downloaded through the Internet and recorded onto the disk 60.

The reproduction of the audio data will now be described. The audio data recorded on the disk 60 is read out by the media drive unit and stored into the SDRAM 63. The audio data which is outputted from the SDRAM 63 is supplied to the audio encoder/decoder unit 65 through the SDRAM I/F 62.

A command for a decoding process is issued from an audio control unit 41b in the CPU 41 to the audio encoder/decoder unit 65 through a DSP (Digital Signal Processor) I/F 64.

On the basis of the command from the CPU 41, the decoding process is executed in the audio encoder/decoder unit 65. The decoded audio signal is converted into an analog signal by a D/A converting unit 66, amplified by an amplifying unit 67, and thereafter, supplied to a headphone terminal 68. In the audio encoder/decoder unit 65, the encoding/decoding according to, for example, an ATRAC (Adaptive Transform Acoustic Coding) method is executed.

A construction of the media drive unit 61 will now be described with reference to FIG. 7. The media drive unit 61 has a turntable on which a disc of the existing MD system, a disc of the next-generation MD1, and a disc of the next-generation MD2 are put. In the media drive unit 61, the disk 60 put on the turntable is rotated by a spindle motor 102 in accordance with the CLV method. A laser beam is irradiated onto the disk 60 by an optical head 92 upon recording/reproduction.

The optical head 92 emits a laser beam at a high level for heating the recording track to a Curie temperature in the recording mode. In the reproducing mode, the optical head 92 emits the laser beam at a relatively low level for detecting the data from the reflection light by a magnetic Kerr effect. Therefore, although not shown in detail, a laser diode serving as laser output means, an optical system including a polarization beam splitter, an objective lens, and the like, and a detector to detect the reflection light are mounted on the optical head 92. The objective lens equipped for the optical head 92 is held by, for example, a biaxial mechanism so that it can be displaced in the disk radial direction and the direction in which the head approaches or is removed away from the disk.

A magnetic head 91 is arranged at a position where it faces the optical head 92 through the disk 60. The magnetic head 91 executes the operation for applying a magnetic field modulated by the recording data onto the disk 60. Although not shown, a sled motor and a sled mechanism for moving the whole optical head 92 and the magnetic head 91 in the disk radial direction are also provided.

According to the optical head 92 and the magnetic head 91, in the case of the disc of the next-generation MD2, the small mark can be formed by executing the pulse driving magnetic field modulation. In the case of the disc of the existing MD or the disc of the next-generation MD1, the magnetic field modulating method of DC light emission is used.

The media drive unit has a recording processing system, a reproduction processing system, a servo system, and the like in addition to a recording/reproducing head system using the optical head 92 and the magnetic head 91 and a disc rotation driving system using the spindle motor 102.

There is a possibility that the disc of the existing MD specification, the disc of the specification of the next-generation MD1, and the disc of the specification of the next-generation MD2 are loaded as a disk 60. The linear velocities differ depending on those discs. The spindle motor 102 can rotate the discs at rotational speeds corresponding to a plurality of kinds of discs of the different linear velocities. The disk 60 put on the turntable is rotated in correspondence to the linear velocity of the disc of the existing MD specification, to the linear velocity of the disc of the specification of the next-generation MD1, or the linear velocity of the disc of the specification of the next-generation MD2.

Whether the loaded disc is the disc of the next-generation MD1 or the disc of the next-generation MD2 can be discriminated from, for example, the information recorded in the lead-in area. That is, if P-TOC (Table Of Contents) by emboss pits is detected in the lead-in area, it is possible to decide that the loaded disc is the disc of the existing MD or the disc of the next-generation MD1. Control information by the ADIP signal is detected in the lead-in area. If the P-TOC by the emboss pits is not detected, the loaded disc can be determined to be the disc of the next-generation MD2. The invention is not limited to such a discriminating method but, for example, the type of disc may be discriminated by a difference between a phase of a tracking error signal in the on-track state and that in the off-track state.

The recording processing system has: a portion in which in the case of the disc of the existing MD system, the error correction encoding is executed by the ACIRC and the data is EFM-modulated and recorded upon recording of the audio track; and a portion in which in the case of the disc of the next-generation MD1 or the next-generation MD2, the error correction encoding is executed by the combination method of the BIS and LDC and the data is modulated by the 1-7pp modulation and recorded.

The reproduction processing system has a portion in which upon reproduction of the disc of the existing MD system, the EFM-demodulation and the error correcting process by the ACIRC are executed, and upon reproduction of the disc of the next-generation MD1 system or the next-generation MD2 system, the 1-7 demodulation based on the data detection using Partial Response and the Viterbi decoding and the error correcting process by the BIS and the LDC are executed.

A portion to decode the address by the ADIP signal of the existing MD system or the next-generation MD1 and a portion to decode the ADIP signal of the next-generation MD2 are also provided.

The information (photocurrent obtained by detecting the reflection laser beam by a photodetector) detected as reflection light obtained by irradiating the laser beam onto the disk 60 by the optical head 92 is supplied to an RF amplifier 94.

In the RF amplifier 94, current-voltage conversion, amplification, matrix arithmetic operation, and the like are executed to the inputted detection information, thereby extracting a reproduction RF signal, a tracking error signal TE, a focusing error signal FE, groove information (ADIP information recorded on the disk 60 by wobbling of the track), and the like as reproduction information.

When the disc of the existing MD system is reproduced, the reproduction RF signal obtained by the RF amplifier is processed by an EFM demodulating unit 97 and an ACIRC decoder 98. That is, after the reproduction RF signal is binarized into an EFM signal train by the EFM demodulating unit 97, it is EFM-demodulated and further subjected to an error correction and a deinterleaving process by the ACIRC decoder 98. That is, at this point of time, the data is in the state of the ATRAC compression data.

Upon reproduction of the disc of the existing MD system, a (B) contact side of a selector 99 is selected, so that the demodulated ATRAC compression data is outputted as reproduction data from the disk 60.

When the disc of the next-generation MD1 or the next-generation MD2 is reproduced, the reproduction RF signal obtained by the RF amplifier 94 is processed by an RLL(1-7)PP demodulating unit 95 and an RS-LDC decoder 96. That is, as for the reproduction RF signal, in the RLL(1-7)PP demodulating unit 95, reproduction data serving as an RLL (1-7) code train is obtained by the data detection using the PR(1,2,1)ML or the PR(1,−1)ML and the Viterbi decoding, and an RLL(1-7) demodulating process is executed to the RLL(1-7) code train. The error correction and the deinterleaving process are further executed in the RS-LDC decoder 96.

When the disc of the next-generation MD1 or the next-generation MD2 is reproduced, an (A) contact side of the selector 99 is selected and the demodulated data is outputted as reproduction data from the disk 60.

The tracking error signal TE and the focusing error signal FE which are outputted from the RF amplifier 94 are supplied to a servo circuit 100 and the groove information is supplied to an ADIP demodulating unit 103.

After the groove information is band-limited by a band pass filter and a wobble component is extracted, the ADIP demodulating unit 103 demodulates the ADIP signal by executing the FM demodulation and biphase demodulation. The demodulated ADIP signal is supplied to an address decoder 105 and an address decoder 106.

In the disc of the existing MD system or the disc of the next-generation MD1 system, an ADIP sector number consists of 8 bits. On the other hand, in the disc of the next-generation MD2 system, an ADIP sector number consists of 4 bits. The address decoder 105 decodes an ADIP address of the disc of the existing MD or the disc of the next-generation MD1. The address decoder 106 decodes an ADIP address of the next-generation MD2.

The ADIP addresses decoded by the address decoders 105 and 106 are supplied to a drive controller 104. The drive controller 104 executes a desired control process on the basis of the ADIP addresses. The groove information is supplied to the servo circuit 100 to make spindle servo control.

The servo circuit 100 forms a spindle error signal for CLV or CAV servo control on the basis of an error signal obtained by, for example, integrating a phase error between the groove information and a reproduction clock (PLL system clock upon decoding).

The servo circuit 100 forms various servo control signals (a tracking control signal, a focusing control signal, a sled control signal, a spindle control signal, and the like) on the basis of the spindle error signal, the tracking error signal and focusing error signal supplied from the RF amplifier 94, or a track jump command, an access command, or the like from the drive controller 104 and outputs those control signals to a motor driver 101. That is, the servo circuit 100 executes necessary processes such as phase compensating process, gain process, target value setting process, and the like in accordance with the servo error signal and commands, thereby forming the various servo control signals.

The motor driver 101 forms desired servo drive signals on the basis of the servo control signals supplied from the servo circuit 100. As servo drive signals here, there are a biaxial drive signal (two kinds of drive signals in the focusing direction and the tracking direction) to drive the biaxial mechanism, a sled motor drive signal to drive the sled mechanism, and a spindle motor drive signal to drive the spindle motor 102. By such servo drive signals, the focusing control and tracking control to the disk 60 and the CLV or CAV control to the spindle motor 102 are made.

When the audio data is recorded onto the disc of the existing MD system, a selector 89 is connected to a (B) contact, so that an ACIRC encoder 87 and an EFM modulating unit 88 function. In this case, the compression data supplied from the SDRAM 63 is interleaved and added with the error correction code by the ACIRC encoder 87 and, thereafter, EFM-modulated by the EFM modulating unit 88.

The EFM modulation data is supplied to a magnetic head driver 90 through the selector 89 and the magnetic head 91 applies a magnetic field to the disk 60 on the basis of the EFM modulation data, so that the recording of the track is executed.

When the data is recorded onto the disc of the next-generation MD1 or the next-generation MD2, the selector 89 is connected to an (A) contact, so that an RS-LDC encoder 85 and an RLL(1-7)PP modulating unit 86 function. In this case, the high density data supplied from the SDRAM 63 is interleaved and added with the error correction code of the RS-LDC method by the RS-LDC encoder 85 and, thereafter, RLL(1-7)-modulated by the RLL(1-7)PP modulating unit 86.

The recording data as an RLL(1-7) code train is supplied to the magnetic head driver 90 through the selector 89. The magnetic head 91 applies a magnetic field to the disk 60 on the basis of the modulation data, so that the recording of the data track is executed.

Although a laser driver/APC 93 allows a laser diode to execute the laser light emitting operation in the reproducing mode and the recording mode, it also executes what is called an APC (Automatic Laser Power Control) operation.

That is, although not shown, a detector to monitor a laser power is provided in the optical head 92 and its monitor signal is returned to the laser driver/APC 93. The laser driver/APC 93 compares with the present laser power obtained as a monitor signal with the preset laser power and reflects its error difference to the laser drive signals, thereby controlling so that the laser power which is outputted from the laser diode is stabilized to the set value.

As a laser power, values of a reproducing laser power and a recording laser power are set into a register in the laser driver/APC 93 by the drive controller 104.

The drive controller 104 controls so that the above operations (accessing operation, various servo operations, data writing operation, and data reading operation) are executed on the basis of the instructions from the CPU 41.

Figure 7:
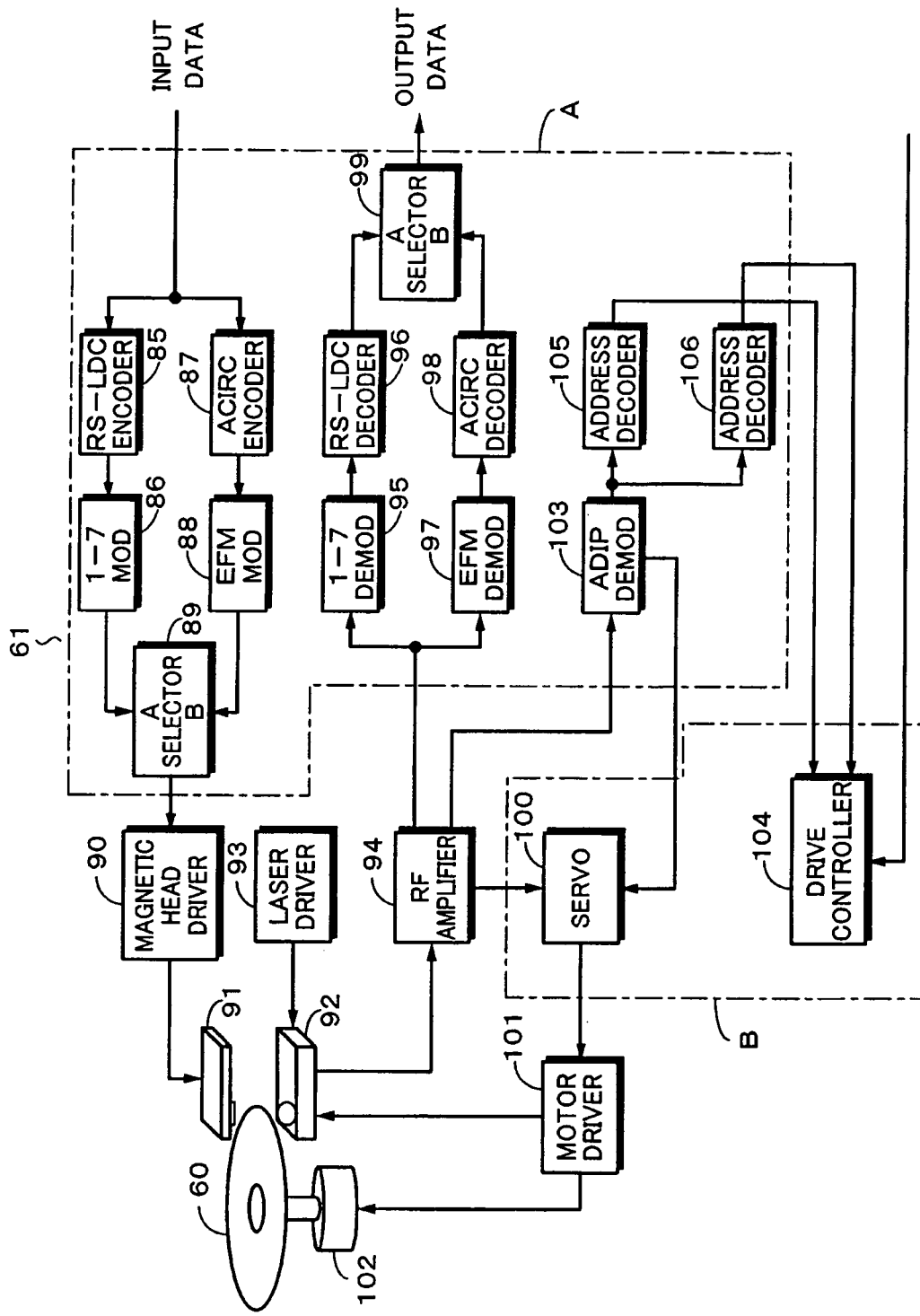
FIG. 7 is a block diagram showing a construction of a media drive unit in the embodiment of the invention.

In FIG. 7, each of an (A) section and a (B) section surrounded by an alternate long and short dash line can be constructed as, for example, a 1-chip circuit unit.

Returning to FIG. 6, the control unit to control the camera 1 will now be described. The CPU 41 as a control unit of the camera 1 in the embodiment has the camera control unit 41a and the audio control unit 41b and they can be switched in accordance with each mode. Each program which is executed by the CPU 41 is stored into a ROM (Read Only Memory) 53 and read out and executed in accordance with the process. Although the apparatus has one CPU 41 in the embodiment, the camera control and the audio control may be also made by different CPUs.

The operation unit will now be described. An input unit 70 in FIG. 6 is a general name of the input devices equipped for the camera main body. When a predetermined input device of the input unit 70 is operated, an input signal corresponding to the operated input device is converted into a digital signal by an A/D port 71. The digital signal is supplied to the CPU 41. The CPU 41 analyzes the supplied digital signal, executes the program to realize the function corresponding to the operation, and controls each unit.

The operation of the input unit 70 in the camera 1 can be efficiently executed by a GUI (Graphical User Interface) using the display of the LCD 16.

Returning to FIG. 6, another input device will be described. An input signal corresponding to the operation of a remote controller 73 connected to the camera 1 through a serial I/F 72 is inputted to the A/D port 71 of the camera 1. As an A/D port 71, an A/D port for the signal supplied from the input unit 70 in the camera 1 and an A/D port of the signal supplied from the remote controller 73 are separately provided.

The reproduction display of the image data upon execution of the slideshow as a feature of the invention and the reproduction of the audio data will now be described. In the following description, it is assumed that the image data and the audio data have mixedly been recorded on the disk 60.

When the slideshow is executed, an image file in which the thumbnail images recorded on the disk 60 have been recorded (hereinafter, such an image file is referred to as an image file thmb) is read out and stored into the SDRAM 63 by the media drive unit 61.

Figure 8:
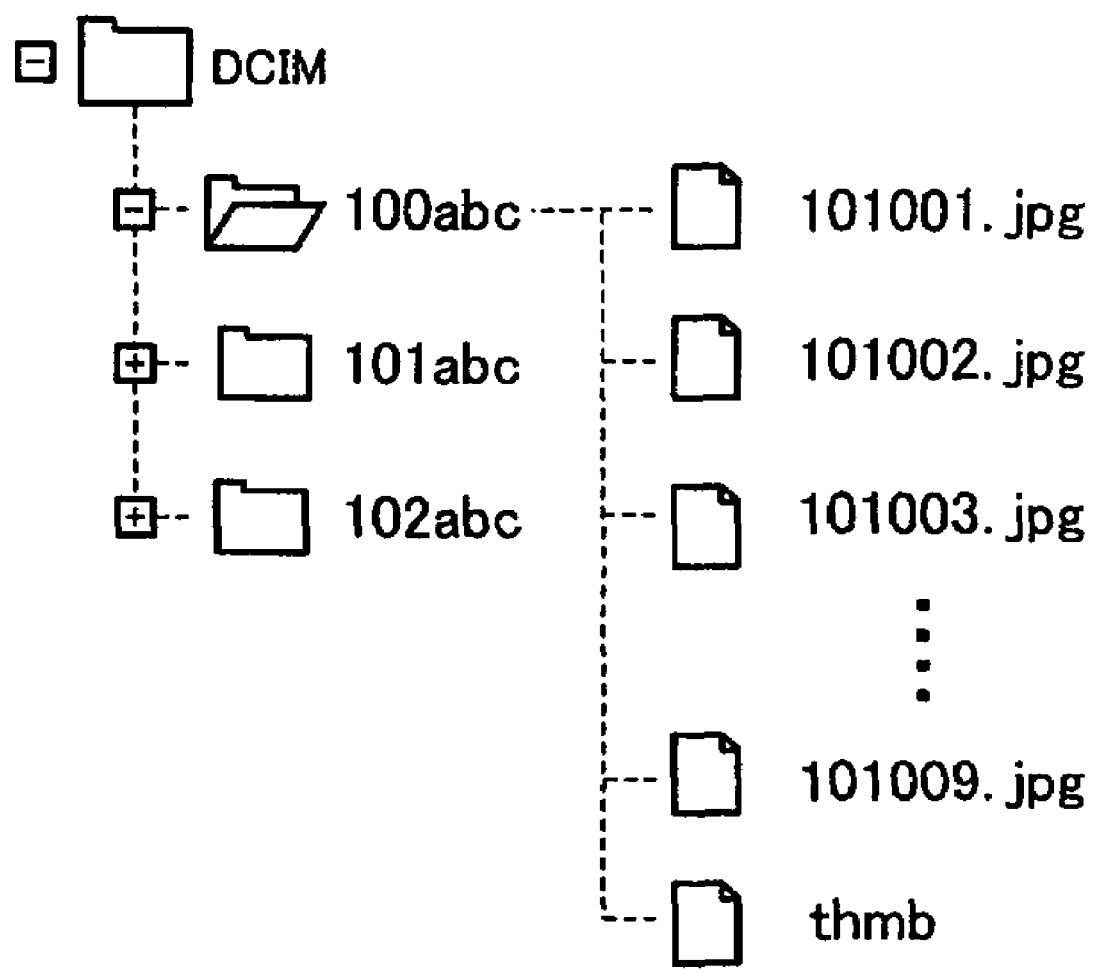
FIG. 8 is a diagram showing an example of a file construction of image data recorded on a disk.

FIG. 8 shows an example of a construction of a folder of the image data recorded on the disk 60. A DCIM folder is formed on the disk 60. Folders whose names are "100abc", "101abc", and "102abc" are formed in the lower layer. Although the settings of the folder names differ depending on the specification of the camera 1, for example, serial numbers such as 100, 101, and 102 are used.

For example, when the folder "100abc" is selected, the image files in the folder are displayed. For example, nine image files shown by "101001.jpg" to "101009.jpg" and compressed by JPEG are stored in the folder "100abc" in the embodiment. Each image file has a data structure specified by, for example, Exif. Specifically speaking, a header regarding the number of pixels, a compressing mode, photographing time/date, and the like, data regarding the main image, and the image data of the thumbnail image obtained by reducing the main image are stored.

Further, the image file thmb is formed in the folder "100abc". The image file thmb is a file in which the thumbnail images in each image file are collected. That is, by reading out the image file thmb when the slideshow is executed, the thumbnail images can be displayed and reproduced without reading out the data of the thumbnail images in each image file.

Figure 9:
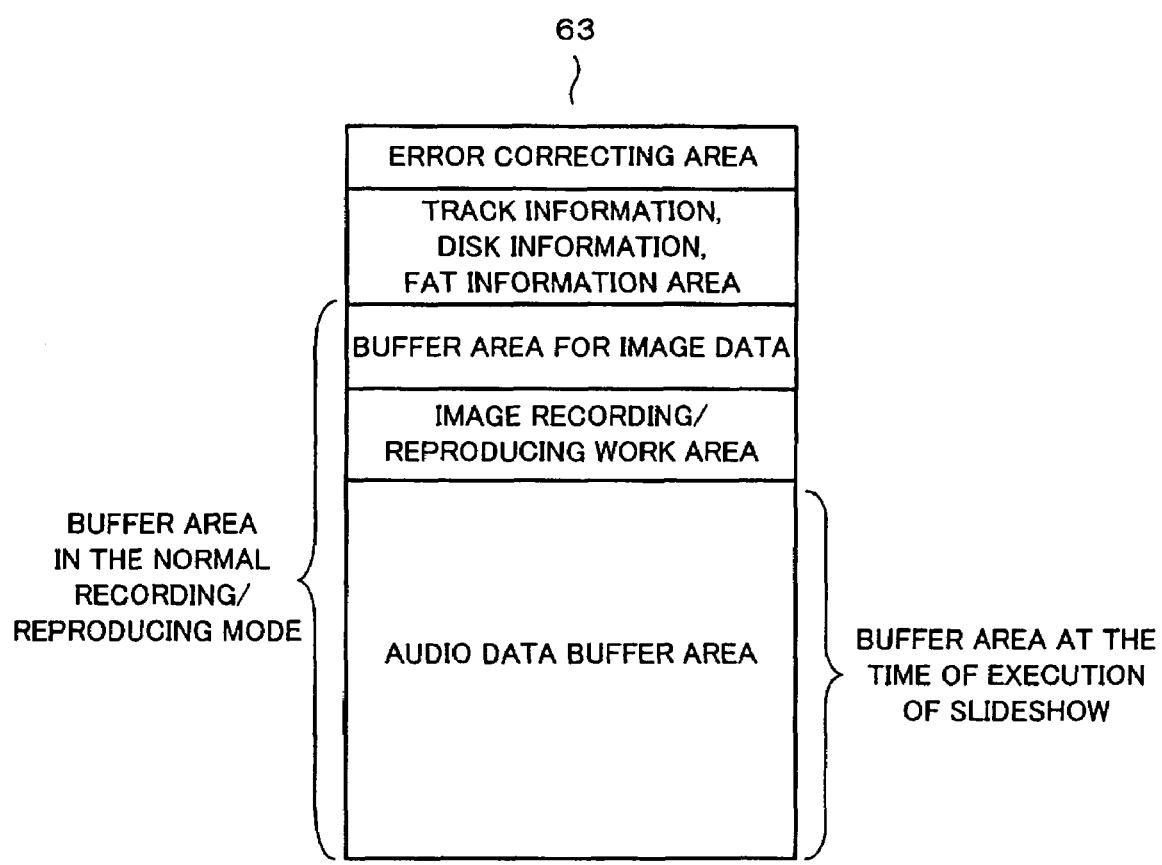
FIG. 9 is a schematic diagram showing an example of an SDRAM in the embodiment of the invention.

The image file thmb read out of the disk 60 is stored in the SDRAM 63. FIG. 9 shows an example of an area construction of the SDRAM 63. As mentioned above, the error correcting area, an area in which the track information and the FAT information are managed, and the like are provided for the SDRAM 63. When the slideshow is executed, a buffer area for the image data to store the image file thmb is further provided. A work area to record and reproduce the image data is provided. The residual area is used as a buffer area for the audio data in the SDRAM 63.

Although the image file thmb is read out when the slideshow is executed in the embodiment, it may be read out when the disk 60 is loaded into the camera 1.

The image file thmb is stored in the SDRAM 63 and the audio reproduction is executed as mentioned above. The feature of the audio data is detected and an interval for switching the thumbnail image is determined by the CPU 41 by a method, which will be explained hereinafter, or the like.

The CUP 41 has a timer function and when the time of the decided interval elapses, an interrupting process for switching the thumbnail image is executed. That is, the image data of the next thumbnail image stored in the image data buffer in the SDRAM 63 is accessed, the predetermined signal processes as mentioned above are executed, and the resultant image is displayed to the LCD 16.

The thumbnail images may be displayed in order of the older photographing time/date, that is, in order of the smaller image file number or may be displayed at random.

The detection of a feature of the music will now be described. As a method of detecting the feature of the music, it is possible to use a method whereby the user sets the display interval or a method whereby the camera 1 automatically detects a feature of the music and sets a display interval in correspondence to the detected feature of the music.

An example of the method whereby the user sets the display interval will now be described. For example, there is a method whereby upon audio reproduction, the timing when the user wants to switch the thumbnail image is recorded into the camera 1.

That is, the user presses a predetermined button at regular intervals and the time intervals at which the button has been pressed are recorded. An average value of the recorded time intervals is calculated by the CPU 41 of the camera 1 and recorded into, for example, the RAM 49. This average value is set to an interval at which the photographed images are switched.

Figure 10:
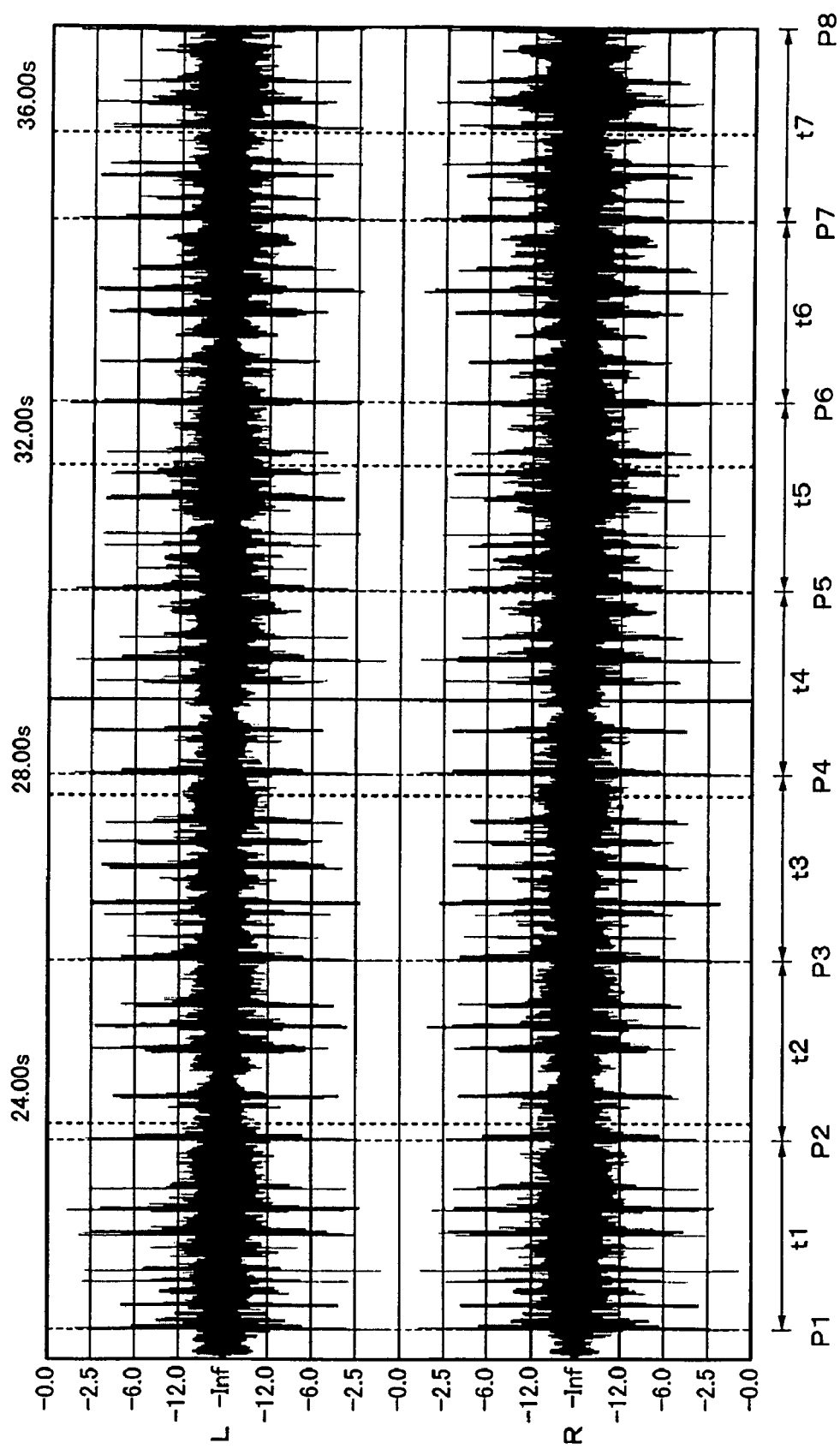
FIG. 10 shows waveforms of audio data in the embodiment of the invention.

FIG. 10 shows waveforms of an audio level of certain music. It is assumed that the user pressed a button at timing P1, P2, and P3 while listening to the music. Each of the timing P1, P2, P3, . . . indicates a beat or bar of the music such as quadruple time. In the CPU 41, time intervals t1, t2, and t3 when the button is pressed are calculated and an average value of t1, t2, and t3 is calculated. The calculated average value is stored in the RAM 49 and this average value is set to the interval at which the photographed images are switched.

By allowing the button pressing timing P1, P2, P3, . . . to coincide with a bar of the music (for example, quadruple time), the button pressing intervals t1, t2, t3, . . . are set to almost 4 beats (1 bar) and an average value of the intervals also approaches 4 beats (1 bar). Therefore, the intervals when the photographed images are switched are set to almost 4 beats (1 bar) and the photographed images can be switched in accordance with the tempo (that is, bar) of the music.

Figure 11A:
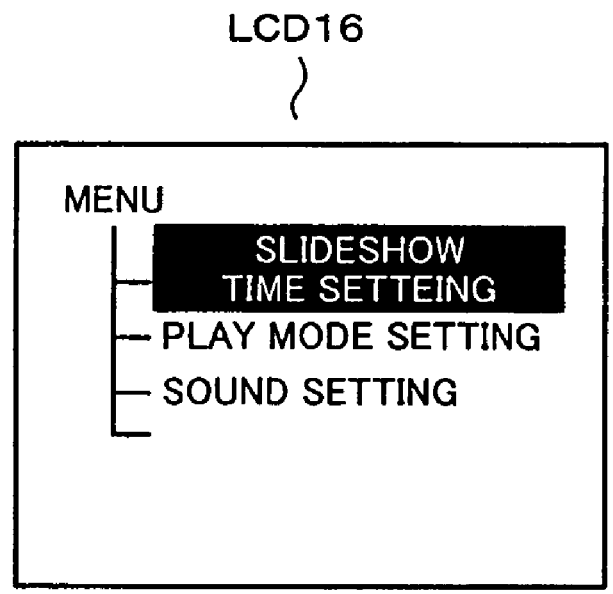
FIGS. 11A and 11B are display screens each for setting a slideshow time in the embodiment of the invention.
Figure 11B:
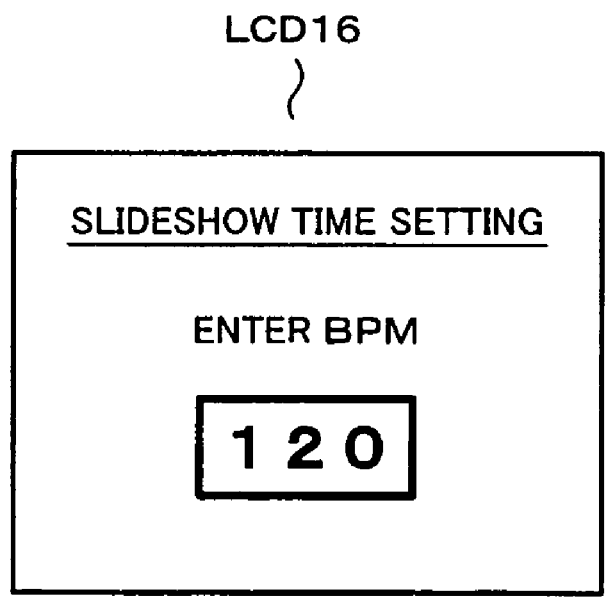

As shown in FIG. 1A, it is also possible to provide a slideshow time setting for a menu display screen which is displayed on the LCD 16 and set the time interval. When the slideshow time setting is selected, a display screen to input a BPM (Beat Per Minute) is displayed as shown in FIG. 11B. The BPM denotes the number of beats per minute and the beat denotes a tempo of a music piece. For example, 60 BPM denotes one beat per second and 120 BPM denotes one beat per 0.5 second.

For example, the BPM of the music is often written in a musical score or the like. Therefore, by inputting and setting the written BPM, the user can switch the slideshow according to the tempo of the music. A numerical value of the BPM is inputted by using, for example, the jog dial 38 or the like or it may be inputted by using the remote controller 73.

Attribute information corresponding to the audio data may be used as a numerical value of the BPM. As shown in FIG. 12, there is a case where besides an artist name, a title, and an album name, tempo information (BPM) showing the tempo of the audio data is added as attribute information to each audio data.

Figure 13:
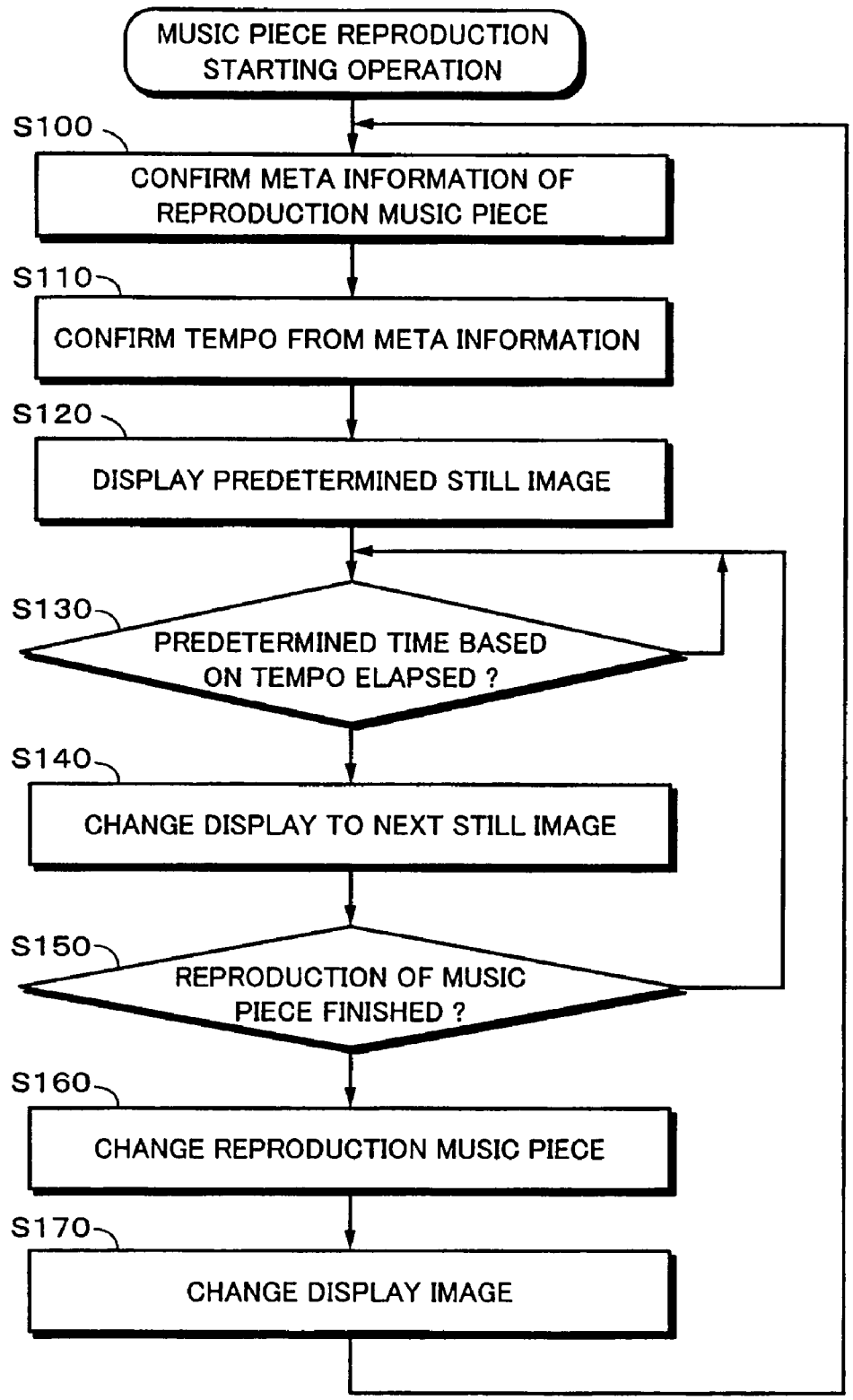
FIG. 13 is a flowchart showing processes in the case where a display switching interval of images is determined on the basis of the attribute information.

FIG. 13 shows processes in the case where the display switching interval of the images is determined on the basis of the attribute information.

When the user instructs the reproduction of predetermined audio data, the attribute information of the audio data selected as a reproduction target is confirmed (step S100).

By confirming the attribute information, the CPU 41 can recognize the BPM of each audio data (S110).

When a slideshow start command of the images is subsequently inputted by the user, the image data as a slideshow target is displayed on the LCD 16 (S120). The slideshow target image data may be a set of image data which has previously been selected by the user or may be image data which is selected at random.

The CPU 41 determines the changing interval of the images which are displayed on the basis of the BPM extracted from the attribute information. For example, when a value of the BPM is large, since the tempo is fast, the switching interval is set to be shorter. When the value of the BPM is small, since the tempo is slow, the switching interval is set to be longer. The CPU 41 measures the elapsed time after the predetermined image is displayed on the LCD 16 (S130). When the measured time exceeds the timing of the switching interval calculated from the BPM of the audio data which is being reproduced, the CPU 41 changes the display screen to another image data (S140). After the display screen is switched to another image data, the elapsed time from the switching timing is measured again. The display of another image data is continued until the next switching timing comes. As mentioned above, when the reproduction of the same audio data is continued, the image data is sequentially displayed on the LCD 16 at the switching interval calculated from the BPM of the audio data whose reproduction is continued.

When the reproduction of the reproducing audio data is finished, the reproduction of another audio data is started (S150, S160).

When the CPU 41 recognizes the change in the audio data to be reproduced, it also switches the image data displayed on the LCD 16 to another audio data (S170).

After that, the CPU 41 extracts the BPM from the attribute information of the next reproducing audio data, switches the images to be displayed on the LCD 16, and displays them on the basis of the display switching interval calculated from the BPM.

As mentioned above, the switching timing of the display data to be displayed to the image is set in accordance with the audio data which is being reproduced and the image data is switched and displayed on the basis of the set timing.

Figure 14:
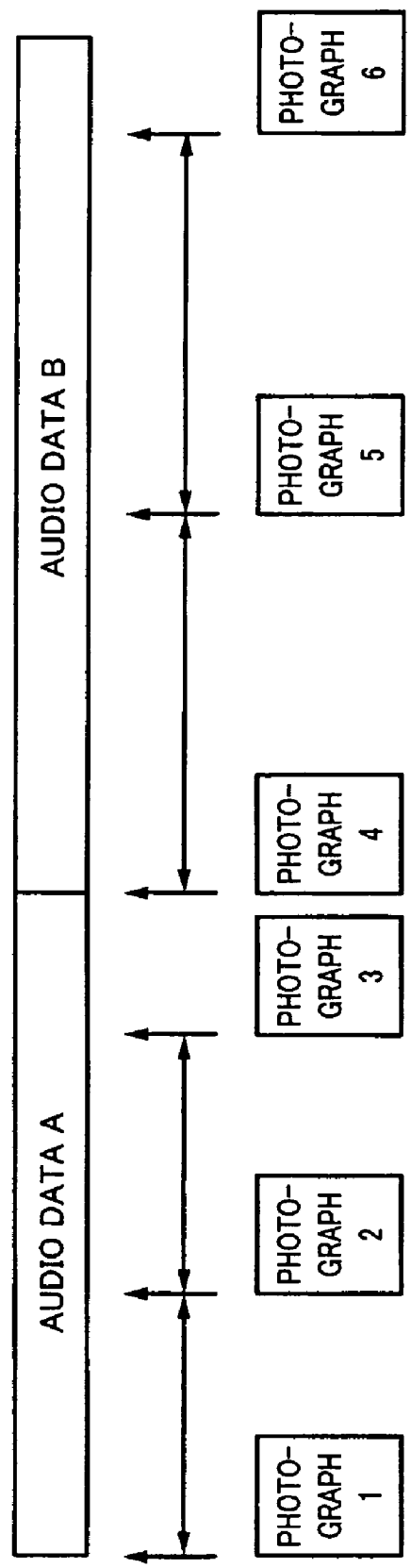
FIG. 14 shows timing for image display switching in the case where audio data (A) whose BPM (beat Per Minute) is equal to 100 and audio data (B) whose BPM is equal to 50 are continuously reproduced.

FIG. 14 shows the timing for the image display switching in the case where audio data (A) whose BPM is equal to 100 and audio data (B) whose BPM is equal to 50 are continuously reproduced. The image switching interval at which the audio data (A) whose BPM is equal to 100 is reproduced is shorter than that when the audio data (B) is reproduced. This is because the BPM of the audio data (A) is larger than that of the audio data (B) and the tempo of the audio data (A) is faster than that of the audio data (B).

An example in which the feature of the music is automatically detected by the camera 1 will now be described.

Figure 15:
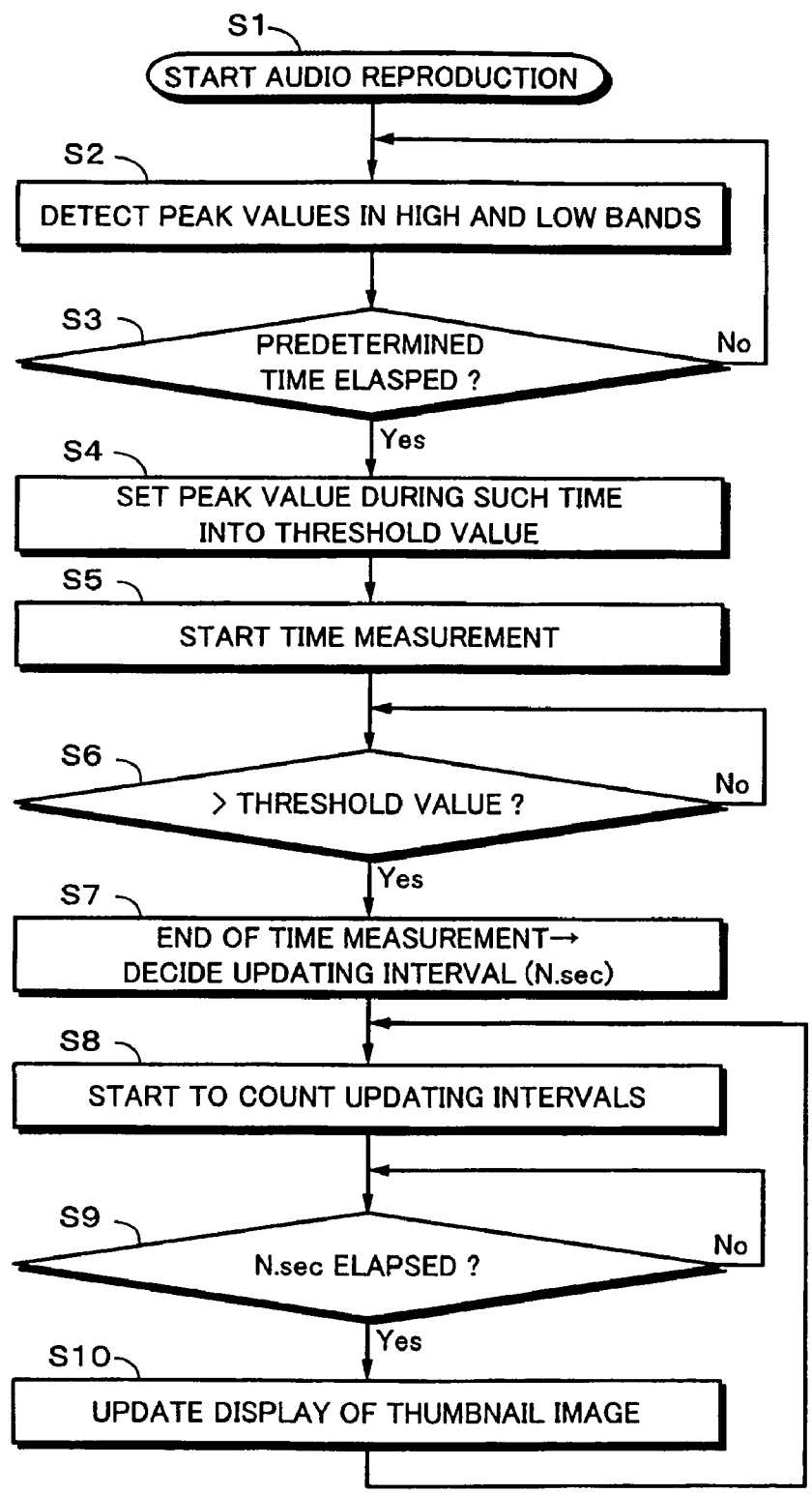
FIG. 15 is a flowchart for deciding a display interval in the embodiment of the invention.

FIG. 15 shows a flow for processes in the case where the feature of the music is automatically detected and the thumbnail image is switched synchronously with a change in the detected feature.

In step S1, the slideshow button 20 is pressed, the image file thmb is read out, and the reproduction of the audio data is started. When the reproduction of the audio data is started, the processing routine advances to step S2 and subsequent steps. In the CPU 41, the process for detecting the feature of the music is executed.

In step S2, a peak value of a high band and/or a low band of the audio data is detected to detect the tempo of the music. The detection of the peak value is continued to be executed until the elapse of a predetermined time (step S3). When the predetermined time (assumed to be t seconds in the embodiment) elapses in step S3, the processing routine advances to step S4 and the peak value of t seconds is set to a threshold value.

Subsequently, step S5 follows and after the threshold value is determined, the measurement of time is started. Step S6 follows and whether or not the audio level has exceeded the threshold value is discriminated. When it exceeds the threshold value, step S7 follows and the measurement of time is finished.

A time interval which is required until the audio level has exceeded the threshold value after the start of the measurement of time is set to an updating interval (N seconds) as an interval at which the thumbnail image is switched. When the updating interval (N seconds) is decided, step S8 follows and the counting operation of the updating intervals is started. Step S9 follows and when the time interval (N seconds) elapses, the next thumbnail image is read out of the image file thmb stored in the SDRAM 63 and the display of the thumbnail image is updated by an interrupting process of the CPU 41 (step S10).

The threshold value may be set to a value smaller than the peak value, for example, 75% of the peak value.

Many modifications and applications of the present invention are possible within the scope without departing from the spirit of the invention. The invention is not limited to the foregoing embodiment. For example, although the magnetooptic disk has been used as a recording medium of the data in the embodiment, another medium such as HDD (Hard Disk Drive), semiconductor memory, or the like can be also used. The input keys which are provided for the camera 1 may be constructed as a touch panel.

Although the embodiment has been described above with respect to the example using the photographed images and the camera 1 with the audio recording/reproducing function, the invention is not limited to the photographed images but can be also widely applied to an apparatus having a function for simultaneously reproducing an image such as animation image, motion image, or the like and music.

Although the embodiment has been described above with respect to the example of detecting the tempo of the music, it is also possible to use another construction in which attribute information such as melody and genre such as rock, ENKA (Japanese traditional song), popular song, or the like, an amplitude of the audio data, and the like are detected and the display interval is switched.

It is also possible to use a construction in which if a plurality of music pieces have been recorded on the disk 60, the switching timing of the music pieces is detected by the CPU 41, the feature of the music is detected again, and the display interval is determined. Further, the display interval which has been decided once may be made to be variable in the same music.

It should be understood by those skilled in the art that various modifications, combinations, sub-combinations and alterations may occur depending on design requirements and other factors insofar as they are within the scope of the appended claims or the equivalents thereof.

What is claimed is:

1. An image browsing apparatus comprising:
   a display unit for displaying image data comprising a plurality of images;
   a reproducing unit reproducing audio data;
   a detector for detecting a peak value of an audio level of a high band and/or low band in a sample of the audio data, wherein the sample of the audio data samples the audio data for a predetermined period of time from a beginning of the audio data; and
   a controller for:
      setting the peak value detected by the detector as a threshold;
      determining an amount of time between an end of the sample of the audio data and a subsequent portion of the audio data at which the audio level of the high band and/or low band of the audio data exceeds the threshold;
      setting the amount of time as an updating interval for the image data; and
      when the audio data is reproduced by said reproducing unit, controlling an amount of time that each of the plurality of images of the image data is displayed by said display unit based on the updating interval.

2. An apparatus according to claim 1, wherein said detector detects the peak value of the audio level of the high band and/or low band in the sample of the audio data during reproduction of the sample of the audio data by said reproducing unit.

3. An apparatus according to claim 1, further comprising an image pickup unit, and
   wherein said image data comprises a photographed image photographed by said image pickup unit.

4. An apparatus according to claim 1, wherein said detector detects the peak value of the audio level of the high band and/or low band in the sample of the audio data based on attribute data which is added to the audio data.

5. An apparatus according to claim 1, wherein when the audio data which is reproduced by said reproducing unit is changed to another audio data, said control unit changes the image data which is displayed to said display unit to another image data.

6. The apparatus according to claim 1, wherein the audio data comprises at least one song.

7. An image data browsing method of controlling an image changing interval in an image browsing apparatus comprising display means for displaying image data comprising a plurality of images and reproducing means for reproducing audio data, the method comprising:
   detecting a peak value of an audio level of a high band and/or low band in a sample of the audio data, wherein the sample of the audio data samples the audio data for a predetermined period of time from a beginning of the audio data;
   setting the peak value detected by the detector as a threshold;
   determining an amount of time between an end of the sample of the audio data and a subsequent portion of the audio data at which the audio level of the high band and/or low band of the audio data exceeds the threshold;
   setting the amount of time as an updating interval for the image data; and
   when said audio data is reproduced by said reproducing means, controlling an amount of time that each image of the image data is displayed by said display means based on the updating interval.

8. An image data browsing method of controlling an image changing interval in an image browsing apparatus comprising image pickup means for photographing image data, display means for displaying the image data, and reproducing means for reproducing audio data, the method comprising:
   photographing the image data by said image pickup means;
   recording said photographed image data;
   detecting a peak value of an audio level of a high band and/or low band in a sample of the audio data, wherein the sample of the audio data samples the audio data for a predetermined period of time from a beginning of the audio data;
   setting the peak value detected by the detector as a threshold;
   determining an amount of time between an end of the sample of the audio data and a subsequent portion of the audio data at which the audio level of the high band and/or low band of the audio data exceeds the threshold;
   setting the amount of time as an updating interval for the image data; and
   controlling the display means so that the image data photographed by said image pickup means is sequentially switched and displayed based on the updating interval.

9. An image browsing apparatus comprising:
   display means for displaying image data comprising a plurality of images;
   reproducing means for reproducing audio data;
   detecting means for detecting a peak value of an audio level of a high band and/or low band in a sample of the audio data, wherein the sample of the audio data samples the audio data for a predetermined period of time from a beginning of the audio data; and
   control means for:
      setting the peak value detected by the detector as a threshold;
      determining an amount of time between an end of the sample of the audio data and a subsequent portion of the audio data at which the audio level of the high band and/or low band of the audio data exceeds the threshold;
      setting the amount of time as an updating interval for the image data; and
      when the audio data is reproduced by said reproducing means, controlling an amount of time that each of the plurality of images of the image data is displayed by said display means based on the updating interval.

* * * * *